United States Patent Office 3,408,312
Patented Oct. 29, 1968

3,408,312
ELECTRICALLY CONDUCTIVE
CERMET COMPOSITIONS
Nolan Earle Richards, Florence, Ala., James Simmons Berry, Jr., Savannah, Tenn., and Thomas Joseph Johnston, Muscle Shoals, Ala., assignors to Reynolds Metals Company, Richmond, Va., a corporation of Delaware
No Drawing. Original application Apr. 7, 1964, Ser. No. 358,068. Divided and this application May 3, 1967, Ser. No. 649,757
13 Claims. (Cl. 252—518)

ABSTRACT OF THE DISCLOSURE

Cermet materials containing about 25% to about 60% by weight of aluminum nitride and an electrically conductive constituent such as titanium diboride or aluminum or both aluminum and a refractory hard metal are produced by compressing and heating a mixture thereof.

---

This application is a division of application Ser. No. 358,068, filed Apr. 7, 1964, now U.S. Patent 3,328,280.

This invention relates to novel production composed of aluminum nitride and an electrically conductive constituent such as aluminum metal or a metallic refractory, or both, and to processes for their manufacture. More particularly, the invention concerns aluminum nitride-aluminum, aluminum nitride-refractory hard metal and aluminum nitride-aluminum-refractory hard metal cermets employed as cathode collector bars in electrolytic cells used for the production of aluminum.

Aluminum metal is customarily produced by the electrolysis of alumina dissolved in molten cryolite in an electrolytic cell or pot. One form of such cell comprises a large tank lined with carbon which serves as the cathode and which contains the molten bath. Large carbon blocks inserted from the top act as the anode. Molten metallic aluminum collects at the bottom of the cell and is drained off periodically. The liberated oxygen combines with the carbon at the anodes and passes off as carbon dioxide gas.

The life of the carbon cell linings is short, and frequent shutdowns for repairs are necessary in commercial operation. The carbon linings act as conducting layers but the porous character of the carbon permits molten cryolite and other bath constituents to penetrate the lining with subsequent damage to the cell casing. It is a desirable practice to employ current collectors made of materials which have good electrical conductivity but which are resistant to attack by bath constituents, and which extend into the molten aluminum layer on the bottom of the cell so as to minimize the flow of electricity within the carbon layer. Materials which have been proposed for such current collectors include the borides, nitrides, and carbides of metals of Groups IV, V and VI of the Periodic System, particularly compounds of titanium and zirconium. However, solid bars of such materials (and especially those of sufficient size to be practicable) are expensive, brittle and tend to crack and swell in use.

Experience has shown that among the prerequisites of a satisfactory material for collector bars in electrolytic reduction cells for aluminum production are (a) the material should be hard and dense, (b) it should be an electrical conductor, (c) it should retain its dimensional stability at temperatures around 1000° C., and (d) it should be stable in contact with and resistant to attack by cryolite-alumina melts and liquid aluminum.

In accordance with the present invention, there are provided aluminum nitride-aluminum and other cermet materials which fully meet the aforesaid stringent requirements. These comprise consolidated mixtures of aluminum nitride as the ceramic constituent, together with a metal or metalloid constituent, or both, as the conductive component. Suitable metalloid constituents are the refractory hard metals (RHM) such as titanium diboride. The proportion of aluminum nitride in the composite should be kept below about 60% by weight, since a greater amount produces a very hard dense product which cannot be cut or abraded by ordinary metal working tools. Moreover, a greater proportion of aluminum nitride in the composite adversely affects its electrical conductivity, and may eliminate it completely. In the case of AlN–Al cermets, the preferred proportion of aluminum nitride lies between about 50% and about 60% by weight. The upper limit for aluminum content is set by the condition that the cermet should not collapse at 1000° C. (by melting of the metal), and by the amount of free or void space remaining in the aluminum nitride matrix after sintering. A preferred composite contains about 57% AlN and about 43% Al metal, by weight.

The composite of aluminum nitride and aluminum powder may be prepared, according to the invention, by any of the methods commonly employed in the preparation of cermets, including hot pressing and sintering, cold pressing, and by impregnation of the aluminum nitride with liquid aluminum metal. Of these, the preferred method is hot pressing and sintering, and the invention will be described within the context of this method.

In the fabrication of aluminum nitride-aluminum bars by hot pressing and sintering, the calculated proportions of atomized aluminum powder and aluminum nitride powder are mixed by shaking with glass or ceramic balls in a rotary mixer. The resulting dry, free flowing mixture is introduced into a conventional type of hot pressing die mounted in a press and surrounded by insulation and induction heating coils. The die is made of graphite, and the mixture is initially compressed to a compact at about 1000 pounds per square inch, using a graphite plunger, but this pressure is exemplary only, and not critical. Where several compacts are to be simultaneously prepared, thin graphite spacing discs may be inserted between each charge. The pressure is applied to the charge until the temperature, monitored by an iridium, iridium-rhodium thermocouple, reaches 1200° C. The pressure is then increased to about 1600 pounds per square inch and the temperature maintained at about 1750° C.±50° C. for about 30 minutes. The system is then allowed to cool under pressure at 600° C., below the melting point of aluminum.

An additional class of cermets produced in accordance with the present invention are composites of aluminum nitride and a refractory hard metal such as titanium diboride; and composites of aluminum nitride, titanium diboride (or other RHM) and aluminum. The ceramic component is the aluminum nitride, and the electrically conducting phases are the titanium diboride and aluminum. The proportion of aluminum nitride in the composite should be between about 60% and about 25% by weight, preferably 35–45 percent. The upper limit for the aluminum nitride is set by the number of randomly contiguous and interlocking titanium diboride particles and the lower limit by the strength imparted to the composite by reason of the sintering and bonding between contiguous aluminum nitride particles. The proportion of aluminum is determined by the free space or voids between the interlocking and sintered particles of aluminum nitride and titanium diboride. Characteristically, the proportion of aluminum is 0 to 15 weight percent aluminum (typically about 10%). The entrapped end electrically conducting aluminum serves to improve and increase the random contacts between titanium diboride particles and hence, the total electrical conductivity of the composite. The aluminum occupies the free space (approximately 15% of the total volume) due to the microscopic voids between interlocking aluminum nitride and titanium diboride particles. Furthermore, the presence of aluminum in the composite improves the mechanical strength and the resistance to thermal shock.

A preferred composite contains about 42% aluminum nitride and 58% titanium diboride, while a preferred composition for an electrically conducting aluminum nitride-titanium diboride-aluminum cermet is about 10.8% Al, 37.4% AlN by weight, and the balance, $TiB_2$.

The composites of aluminum nitride-titanium diboride and aluminum nitride-titanium diboride-aluminum may be prepared according to the invention by any of the methods commonly used in the preparation of cermets including cold pressing and subsequent sintering and hot pressing and sintering. Of these, the preferred method is hot pressing and sintering.

The aluminum nitride-containing cermets thus produced withstand cryolite attack and provide material suitable for aluminum reduction cell collector bars. The bars are electrically conductive, hard, dense, and stable at 1000° C. Conductances in the order of five times that of graphite are obtained, and the compacts have good resistance to thermal shock. The bars conduct current effectively at the temperatures of operation of aluminum reduction cells, and they have expensivities compatible with the graphite and cryolite-alumina cathode linings. A strong bond between the cermet and graphite can be made which remains stable at 1000° C. This bond can be used in fabricating a carbon-cermet bar or in coating graphite.

The practice of the invention is illustrated by the following examples, which are not, however, to be regarded as limiting:

Example 1

A mixture of about 57.2% by weight of —200 mesh aluminum nitride and 42.8% aluminum powder (Grade 120 plus 17, atomized) was prepared and thoroughly blended by shaking in a container with glass balls. The dry, free-flowing mixture was charged into a cylindrical graphite die surrounded by insulation and induction heating coils, which unit was then mounted in a press with a graphite plunger so that the plunger and die provided an enclosed cavity containing the mixture. Pressure of 1000 p.s.i. was applied to the charge until the temperature (monitored by a thermocouple in the die wall) reached about 1200° C. The pressure was then raised to 1600 p.s.i., after which the temperature was increased to 1750° C., and these conditions were maintained for approximately 30 minutes.

This procedure was found to produce a very satisfactory cermet material which was hard, uniformly sintered and conducting, and did not stick to the graphite die. The material maintained its structure at 1000° C. well above the operating temperature of an aluminum reduction cell and, indeed, above the melting point of aluminum.

The density was found to be 2.38 (or about 81% of theoretical), and the conductance was approximately 600 mho-cm.$^{-1}$. The weight loss in conductivity tests carried on at 700° C. for 75 hours was 1.33 weight percent.

In a thermal expansivity test determined over the temperature interval 25°–950° C., based on vitreous silica rod standard, the expansivity (gm. cm.$^{-1}$C.$^{-1}$) was $17 \times 10^{-6}$ over the entire range.

The aluminum nitride-aluminum cermets suffer no damage on exposure to the atmosphere and do not appear to hydrolyze in cold water. Thus, bars and other shapes can be safely stored and shipped without stringent protection from the atmosphere.

Example 2

In the fabrication of an aluminum nitride-titanium diboride cermet, the calculated proportions of particles in the range of 200 to 5 micron size were mixed in a rotary mixer or ball mixer. The dry free-flowing powder was placed in a conventional type of hot pressing die mounted in a press and surrounded by a susceptor, insulation and induction heating coils. The die was constructed of graphite. Pressure was applied to about 1000 p.s.i. and maintained while the temperature of the preparation was increased to about 1200° C. Then the pressure was increased to about 1800–2000 p.s.i. and the temperature (monitored by an iridium-rhodium alloy thermocouple) raised to 1850° C. The temperature and pressure conditions were maintained for about thirty minutes. The system was allowed to cool under a pressure of 1000 p.s.i. to room temperature. The hard, dense rod can be extruded with the graphite plunger since there is no adhesion to the die walls.

The resulting rod produced from a mixture of about 42% AlN–58% titanium diboride had a specific electrical resistivity of $1.42 \times 10^{-4}$ ohm-cm., density 3.35 gm. cm.$^{-3}$ and withstood molten aluminum and cryolite.

Example 3

Other bars were prepared by cold pressing the desired mixtures of aluminum nitride-titanium diboride, aluminum nitride-titanium diboride-aluminum in a tool steel die at 208,000 p.s.i. The cold pressed bars were then sintered in a graphite die inductively heated at 1850° C. for 25 minutes. The hard, dense and electrically conducting bars had densities in the range 2.9 to 3.1.

Example 4

Following the same general procedures as those for Examples 1 and 2, a mixture was prepared having about 37.6% by weight of —200 mesh aluminum nitride powder, about 10.7% aluminum powder (Grade 40, atomized), and about 51.7% of nominally 5-micron titanium diboride powder. This mixture was charged into the graphite die and a pressure of approximately 2000 p.s.i. was applied while the mixture was heated to about 1850° C. and held at such conditions for about 20 minutes. The pressure also was maintained during subsequent cooling.

The resulting cermet material was readily extruded out of the die, since it did not adhere to the graphite walls. Its density was found to be 3.50 (or about 90% of theoretical) and its resistivity was $1.1 \times 10^{-4}$ ohm-cm.

While present preferred embodiments of the invention have been described, it will be apparent that the invention may be otherwise variously embodied and practiced within the scope of the following claims.

What is claimed is:

1. An electrically conductive cermet composition consisting essentially of from about 25% to about 60% by weight of aluminum nitride, the balance substantially aluminum.

2. An electrically conductive cermet composition comprising a consolidated mixture consisting essentially of from about 25% to about 60% by weight of aluminum nitride, up to about 15% aluminum, the balance substantially titanium diboride.

3. A cermet composition according to claim 2, consisting essentially of about 42% aluminum nitride and about 58% titanium diboride.

4. A cermet composition according to claim 1, consisting essentially of from about 50% to about 60% by weight of aluminum nitride, the balance substantially aluminum.

5. A cermet composition according to claim 1, consisting essentially of a compressed and sintered mixture of about 57% by weight of aluminum nitride and about 43% by weight of aluminum powder.

6. An electrically conductive aluminum nitride-titanium diboride-aluminum metal composition comprising a consolidated mixture consisting essentially of from about 25% to about 60% by weight of aluminum nitride, at least about an equal amount of titanium diboride, and up to about 15% aluminum, each in particulate form.

7. A composition according to claim 6, consisting essentially of about 35–45% by weight of aluminum nitride, about 10% aluminum, the balance substantially titanium diboride.

8. Process for the preparation of an electrically conductive cermet composite which comprises compressing a mixture of about 25% to about 60% by weight of aluminum nitride, from about 40% to about 60% of titanium diboride metal, and up to about 15% aluminum, each in particulate form, and sintering the compressed mixture at about 1850° C. to form a solid composite.

9. Process for the preparation of an electrically conductive cermet composite which comprises providing a mixture of about 25% to about 60% by weight of aluminum nitride, from about 40% to about 60% of a refractory hard metal, and about 10% aluminum, each in particulate form, then compressing and heating said mixture at a pressure of about 1800 to 2000 p.s.i. and a temperature of about 1850° C. to form a solid composite.

10. Process for the preparation of an electrically conductive cermet composite which comprises compressing a mixture of from about 50% to about 60% by weight of finely divided aluminum nitride and from about 40% to about 50% by weight of finely divided aluminum to form a compact and then sintering said compact at a temperature between about 1700° and about 1800° C. to form a solid composite.

11. The process of claim 10 in which the mixture is heated under pressure to a temperature of about 1200° C., after which the pressure is increased to about 1600 p.s.i. and the compressed mixture is heated at a temperature of about 1750° C.

12. An electrically conductive cermet composition consisting essentially of about 35–45% by weight of aluminum nitride, up to about 15% aluminum, the balance substantially refractory hard metal selected from the group consisting of borides, nitrides and carbides of titanium and zirconium.

13. The product of claim 12, containing about 10% aluminum by weight.

References Cited

UNITED STATES PATENTS

| | | | |
|---|---|---|---|
| 2,480,475 | 8/1949 | Johnson | 106—65 |
| 3,003,885 | 10/1961 | Mandorf | 252—520 XR |
| 3,011,982 | 12/1961 | Maduk et al. | 252—520 |
| 3,011,983 | 12/1961 | Ricker et al. | 204—291 XR |
| 3,328,280 | 6/1967 | Richards et al. | 204—243 |

FOREIGN PATENTS

| | | |
|---|---|---|
| 472,682 | 3/1951 | Canada. |

LEON D. ROSDOL, *Primary Examiner.*

J. D. WELSH, *Assistant Examiner.*